United States Patent
Tan et al.

(10) Patent No.: US 7,213,859 B1
(45) Date of Patent: May 8, 2007

(54) PUSH BUTTON RELEASE MECHANISM FOR SUPPLEMENTAL TAILGATES

(75) Inventors: Kian-Huat Tan, Westland, MI (US); Scott Miller, Canton, MI (US); Aldous Cheng, Unionville (CA); Robert Howell, Brooklin (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/495,469

(22) Filed: Jul. 28, 2006

(51) Int. Cl.
*B62D 33/03* (2006.01)
(52) U.S. Cl. .................................. 296/57.1; 296/26.09
(58) Field of Classification Search ............... 296/57.1, 296/26.08, 26.09, 26.1, 26.11; 224/402, 224/403, 405
See application file for complete search history.

(56) References Cited

U.S. PATENT DOCUMENTS 6,364,392 B1 * 4/2002 Meinke ....................... 293/62
6,454,338 B1 * 9/2002 Glickman et al. ......... 296/57.1

* cited by examiner

*Primary Examiner*—Joseph D. Pape
(74) *Attorney, Agent, or Firm*—Gigette M. Bejin; Miller Law Group, PLLC

(57) ABSTRACT

A one hand push button release mechanism is associated with a supplemental tailgate assembly to affect the release of the supplemental tailgate for deployment from the main tailgate apparatus. One embodiment of the push button mechanism engages a wedge having a cam surface that causes the wedge to move vertically with respect to the push button to pull on a linkage that releases a pivoted catch member. A second embodiment utilizes a laterally slidable push button that depresses into the molding to engage a spacer that is laterally movable with the push button to be movable into an interfering position with respect to the catch member to lock the supplemental tailgate in the stowed position. In both embodiments, a spring is operable to bias the locking mechanism into a locked position when the supplemental tailgate is returned to the stored position.

20 Claims, 14 Drawing Sheets

PUSH BUTTON RELEASE MECHANISM FOR SUPPLEMENTAL TAILGATES

BACKGROUND OF THE INVENTION

The present invention relates to vehicle tailgates that include a multifunction assembly extendable therefrom, and, more particularly, to a push button release mechanism to facilitate the utilization of the supplemental tailgate mechanism.

Conventionally, pickup trucks include a tailgate at the back of a bed that closes off a cargo box. Often times, the truck bed is not long enough to hold the cargo, so truck bed extenders have been developed. The truck bed extenders work in conjunction with the tailgate in order to provide additional length to the bed. Some designs for pickup truck bed extenders have flush mounted extenders that are stowed in the tailgate when not in use. Being out of sight when not in use presents a more attractive vehicle, but these designs also require a separate handle to disengage latching mechanisms, which can be very inconvenient for the operator to reach and unnecessarily complicate the tailgate release mechanisms. Other designs for bed extenders mount to the outside of the tailgate, which may be convenient for deployment and avoid concerns with deployment mechanisms, but they tend to interfere with cargo space in the box since the bed extender, when not in use, protrudes into the box. Moreover, it is typical for the vehicle operator to employ the extender only occasionally, so it is undesirable to have the extender exposed at all times, which detracts from the attractiveness of the vehicle.

Another drawback with common bed extenders is that a desirable feature of conventional tailgates may be lost. That is, a conventional tailgate has an ornamental plastic tailgate molding mounted along its top surface. It is meant to provide a surface along which cargo can be slid into the bed without the concern of rusting due to paint being scraped off.

Additionally, it is desirable to have a bed extender that can provide other functions in addition to a bed extender, such as a box extender and an assist step. Such functions may be provided with simple ergonomic operation of the assembly, while still allowing for an attractive appearance for the vehicle when the bed extender is stowed during periods of non-use.

Thus, it is desirable to have a vehicle tailgate with a bed extender that overcomes the drawbacks of the prior art.

SUMMARY OF THE INVENTION

In its embodiments, the present invention contemplates a tailgate assembly for use with a motor vehicle having a pair of spaced, generally vertical side walls and a generally horizontal bed extending therebetween. The tailgate assembly has a tailgate frame including a rear panel and a front panel adapted to pivotally mount generally between the side walls and being operable in a generally horizontal open position, and with the tailgate frame including a left top portion and a spaced right top portion that define a gap therebetween. The tailgate assembly may also have a supplemental tailgate including a guide system mounted generally between the rear panel and the front panel, a frame assembly having two telescoping supports extendable from and retained by the guide system, a cross member connected to the two telescoping supports and extending therebetween, and a pivotable molding mounted pivotable relative to the cross member and located in the gap between the right top portion and the left top portion, and a latch release operatively connected to the pivotable molding.

An embodiment of the present invention also contemplates a supplemental tailgate assembly for use with a vehicle tailgate having a left top portion and a spaced right top portion that define a gap therebetween. The supplemental tailgate assembly may include a guide system adapted to be secured generally within the tailgate, and a frame assembly having two telescoping supports extendable from and retained by the guide system, a cross member connected to the two telescoping supports and extending therebetween and including two spaced pivot mounts thereon. The supplemental tailgate assembly may also include a pivotable molding having two pivot flanges extending therefrom that operatively engage the two spaced pivot mounts such that the pivotable molding is mounted on and pivotable relative to the cross member and adapted to be located in the gap between the right top portion and the left top portion, and a latch release operatively connected to the pivotable molding.

An advantage of an embodiment of the present invention is that a portion of the tailgate molding can be employed to operate as a supplemental tailgate release handle while also avoiding paint scratch concerns on the top surface of the tailgate. This avoids the need for a separate supplemental tailgate release handle assembly and molding, thus reducing the number of parts in the tailgate assembly, reducing the overall costs, and reducing the overall package space within the tailgate needed to perform both functions. Avoiding a separate supplemental tailgate release handle by having the supplemental tailgate release built into the pivotable portion of the tailgate molding has another advantage—the tooling that is used to produce many of the metal parts for the conventional tailgates may also be used for the same metal parts on the tailgates that include the supplemental tailgate.

Another advantage of an embodiment of the present invention is that the supplemental tailgate, when in its retracted position during times of nonuse, will not be noticed by the ordinary observer, and therefore, will not detract from the attractiveness of the vehicle. Moreover, it can closely match the look of tailgates for similar trucks that do not have a supplemental tailgate, thus allowing for essentially the same appearance across that particular line of trucks. This also may reduce opportunities for theft of the system.

A further advantage of an embodiment of the present invention is that the supplemental tailgate handle is easy to reach and operate, no matter what positions the tailgate and supplemental tailgate are in. Moreover, the supplemental tailgate handle is spaced from the conventional tailgate release handle, avoiding unnecessary complications in the tailgate release handle and mechanism, while allowing both to be ergonomically located for ease of operation.

An additional advantage of an embodiment of the present invention is that the highly ergonomic and esthetically pleasing supplemental tailgate assembly still allows for a multi-function bed extender. This supplemental tailgate assembly can be moved to different positions in order to be employed to extend the bed, extend the box, and operate as an assist step.

It is an object of this invention to provide a push button release mechanism operable in conjunction with the supplemental tailgate mechanism to initiate the release of the supplemental tailgate apparatus from the main tailgate assembly.

It is a feature of this invention to permit the supplemental tailgate to be released through the use of a single hand by the operator.

It is an advantage of this invention that the push button release mechanism is operably connected to a lock mechanism to affect release of the lock mechanism in response to the actuation of the push button mechanism.

It is another advantage of this invention that the lock mechanism automatically secures the supplemental tailgate in a locked position in response to being positioned in a stored position.

It is a another object of this invention to provide a push button release mechanism for a supplemental tailgate mechanism that is durable in construction, inexpensive of manufacture, carefree of maintenance, facile in assemblage, and simple and effective in use.

These and other objects, features and advantages are accomplished according to the instant invention by providing a one hand push button release mechanism associated with a supplemental tailgate assembly to affect the release of the supplemental tailgate for deployment from the main tailgate apparatus. One embodiment of the push button mechanism engages a wedge having a cam surface that causes the wedge to move vertically with respect to the push button to pull on a linkage that releases a pivoted catch member. A second embodiment utilizes a laterally slidable push button that depresses into the molding to engage a spacer that is laterally movable with the push button to be movable into an interfering position with respect to the catch member to lock the supplemental tailgate in the stowed position. In both embodiments, a spring is operable to bias the locking mechanism into a locked position when the supplemental tailgate is returned to the stored position.

DETAILED DESCRIPTION OF THE PREFERRED EMBODIMENT

Figure 1:
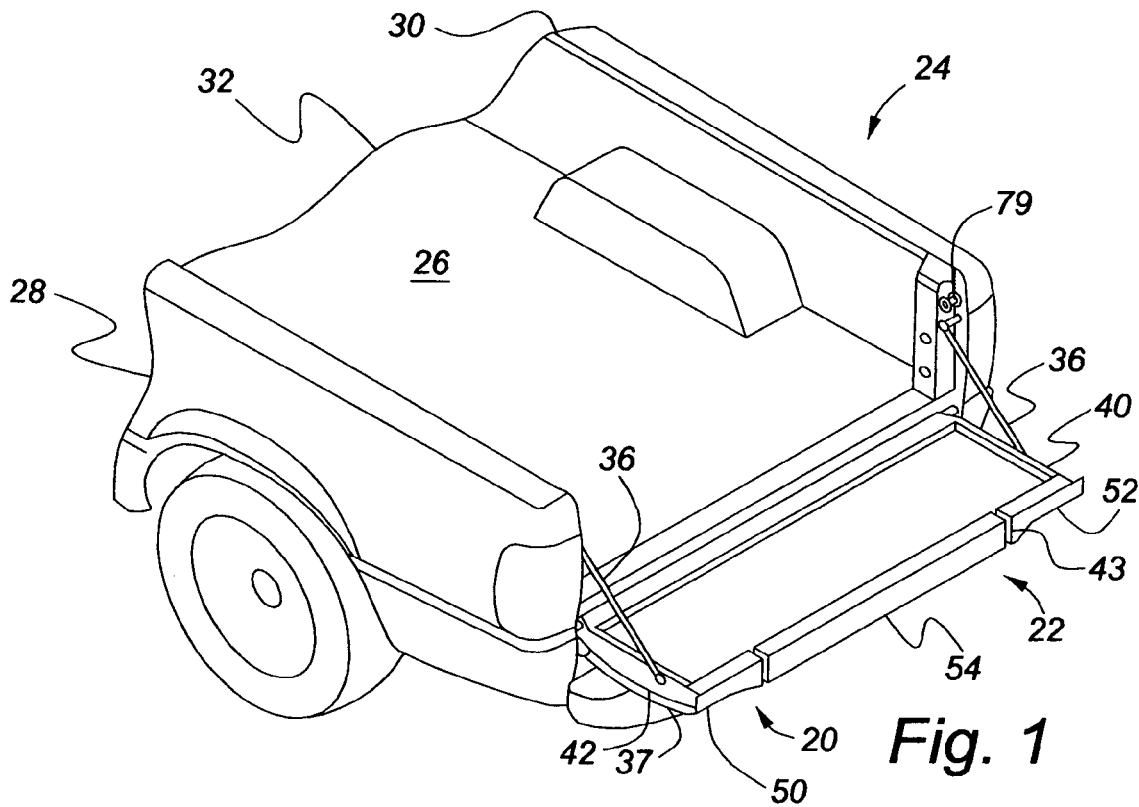
FIG. 1 is a rear perspective view of a vehicle incorporating a tailgate, with the tailgate shown in a generally horizontal open position, in accordance with the present invention.
Figure 2:
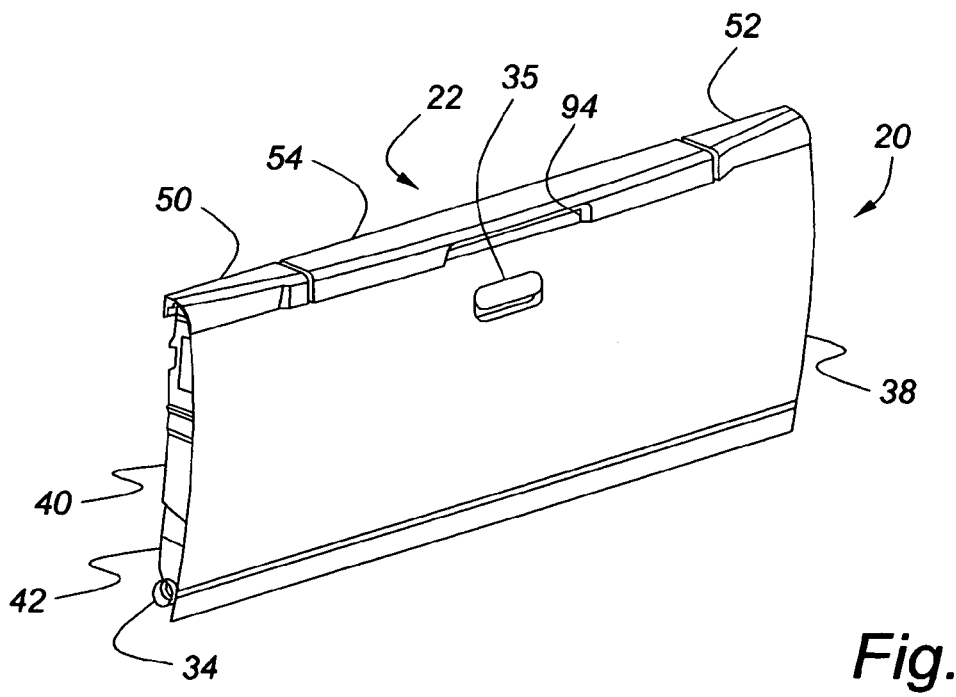
FIG. 2 is a rear perspective view of the tailgate as it would be oriented in a generally vertical closed position on a vehicle, and with the pivotable molding in its latch engaged position, in accordance with the present invention.
Figure 3:
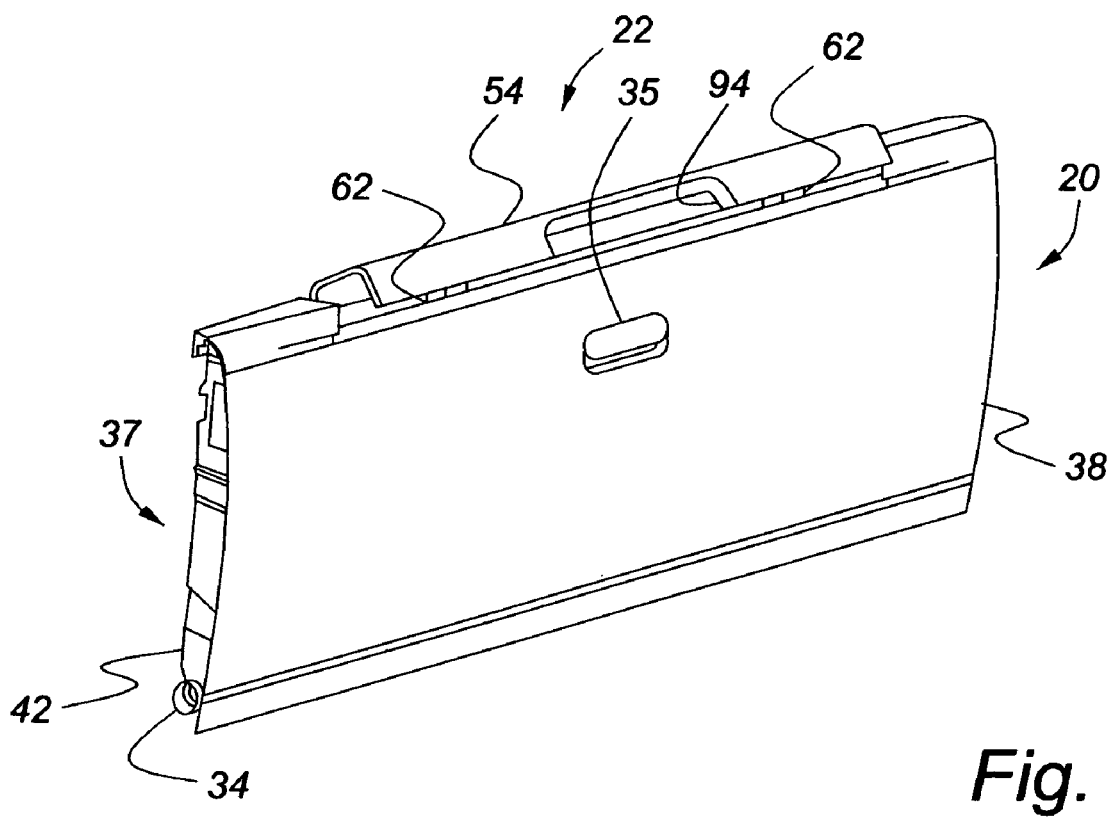
FIG. 3 is a rear perspective view similar to FIG. 2, but with the pivotable molding in its latch disengaged position.
Figure 4:
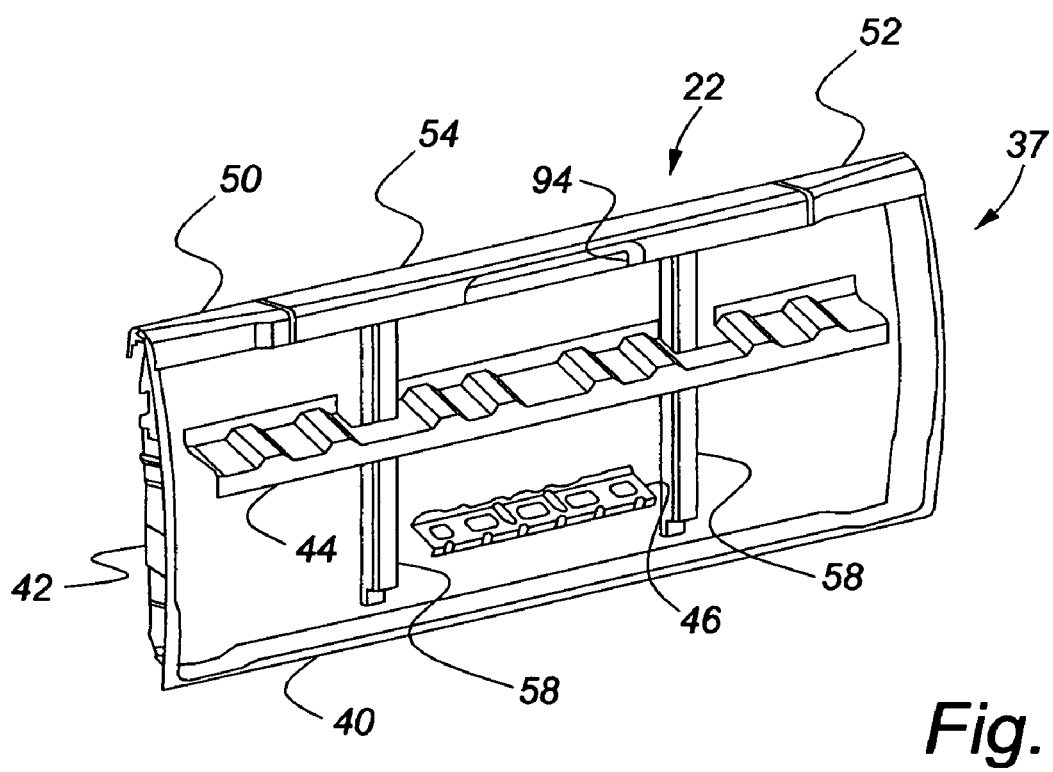
FIG. 4 is a rear perspective view of the tailgate, but with the tailgate frame outer panel not shown, in accordance with the present invention.

FIGS. 1–13 illustrate a tailgate 20 that mounts to a vehicle 24, such as a pick-up truck. The tailgate 20 includes a supplemental tailgate 22 mounted therein. The vehicle 24 includes a box 26 that is defined by a left rear quarter panel 28, which forms a first vertical surface of the box 26; a right rear quarter panel 30, which forms a second vertical surface of the box 28; a bed 32, which extends between the two panels 28, 30 to form a cargo floor; and the tailgate 20, which is pivotable between a generally vertical closed position and a generally horizontal open position.

Figure 5:
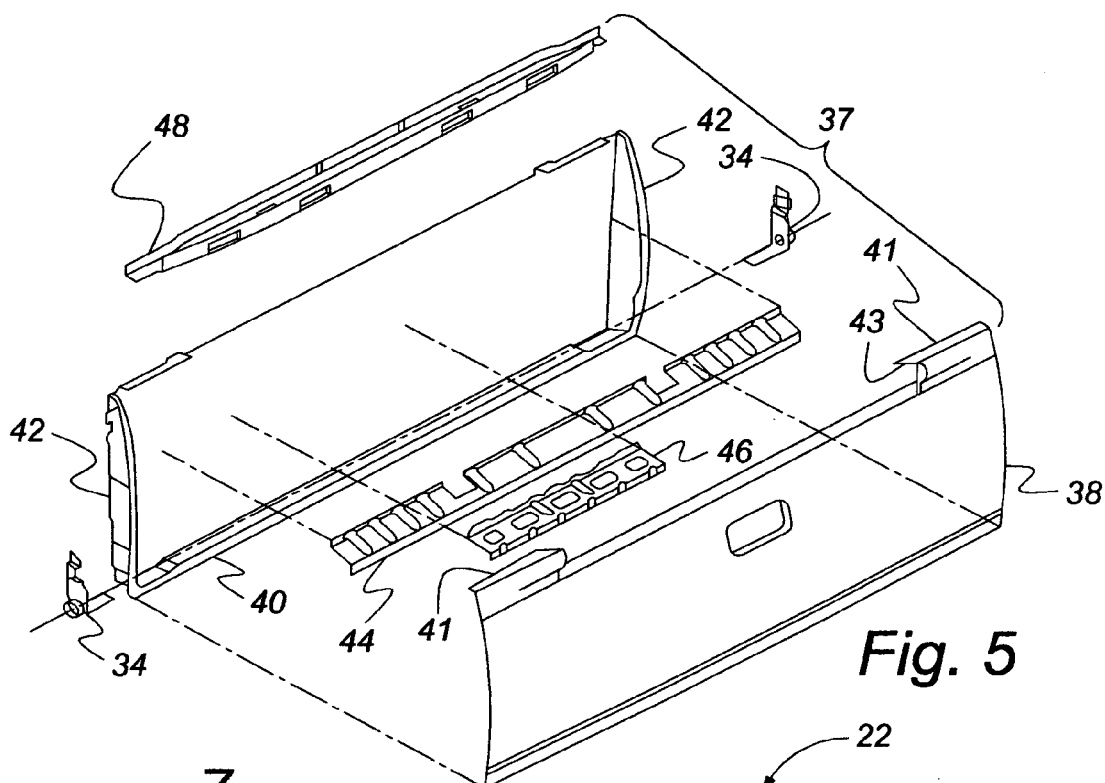
FIG. 5 is a rear exploded perspective view of the tailgate frame, without side moldings shown, in accordance with the present invention.
Figure 6:
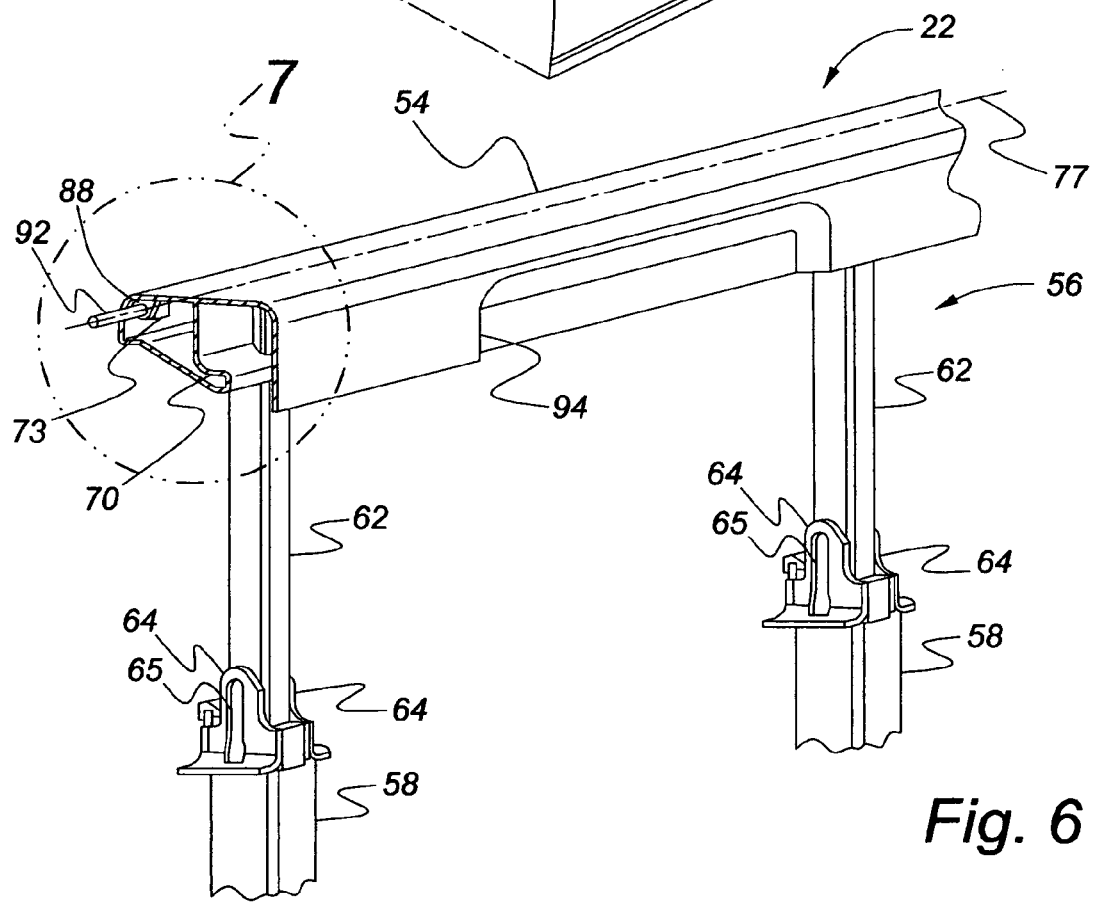
FIG. 6 is a rear perspective, partially sectioned view of the supplemental tailgate in accordance with the present invention.
Figure 7:
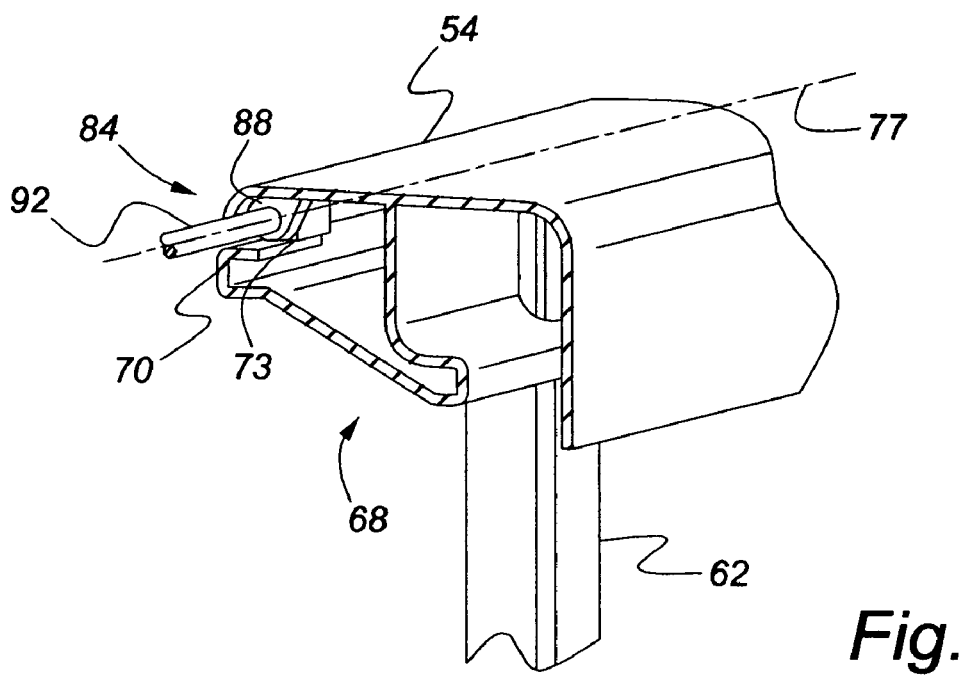
FIG. 7 is a view, on an enlarged scale, illustrating encircled area 7 in FIG. 6.
Figure 8:
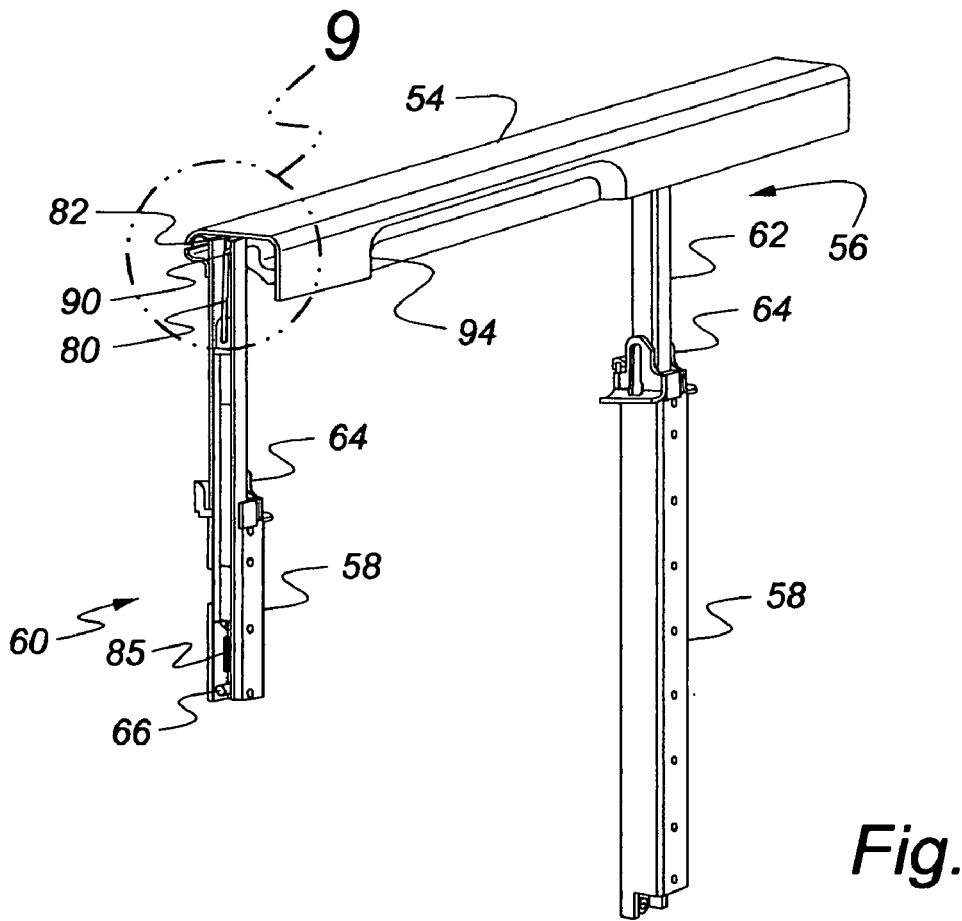
FIG. 8 is a rear perspective, partially sectioned view similar to FIG. 6, but with the section cut taken at a different location.
Figure 9:
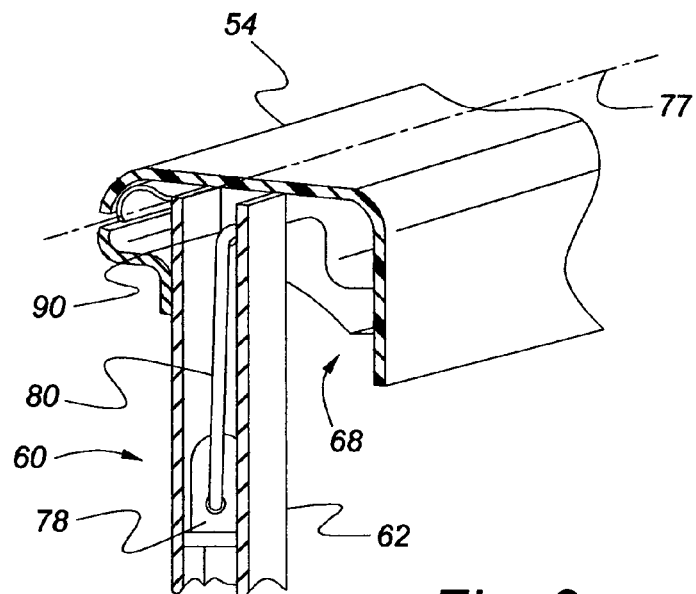
FIG. 9 is a view, on an enlarged scale, illustrating encircled area 9 in FIG. 8.
Figure 10:
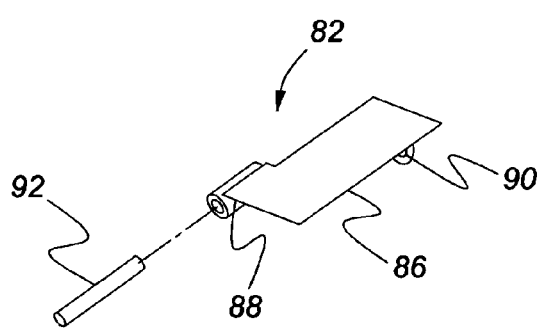
FIG. 10 is a perspective view of a release lever in accordance with the present invention.
Figure 11:
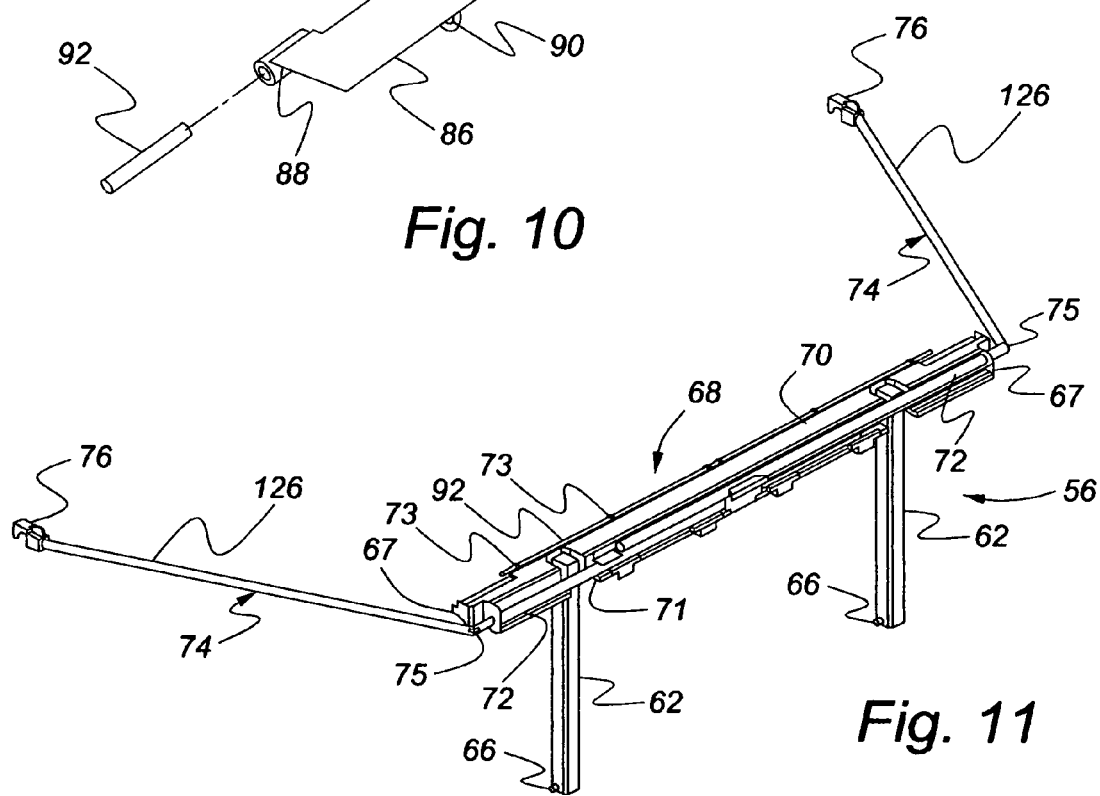
FIG. 11 is a rear perspective view of a movable frame portion of the supplemental tailgate, but without the guide brackets illustrated, in accordance with the present invention.
Figure 12:
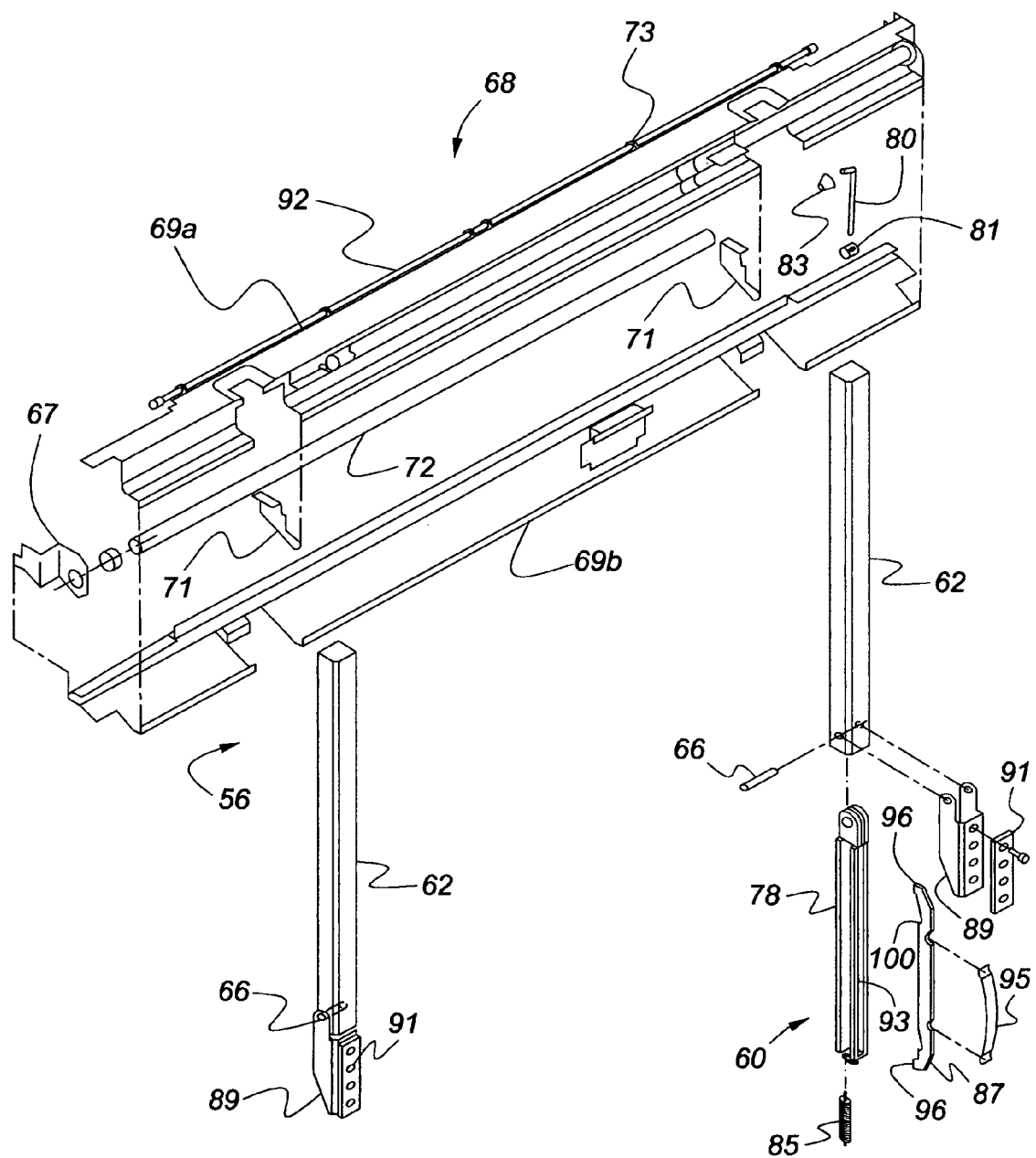
FIG. 12 is a rear perspective view of the movable frame portion, similar to FIG. 11, but without the lock rod assemblies illustrated.
Figure 13:
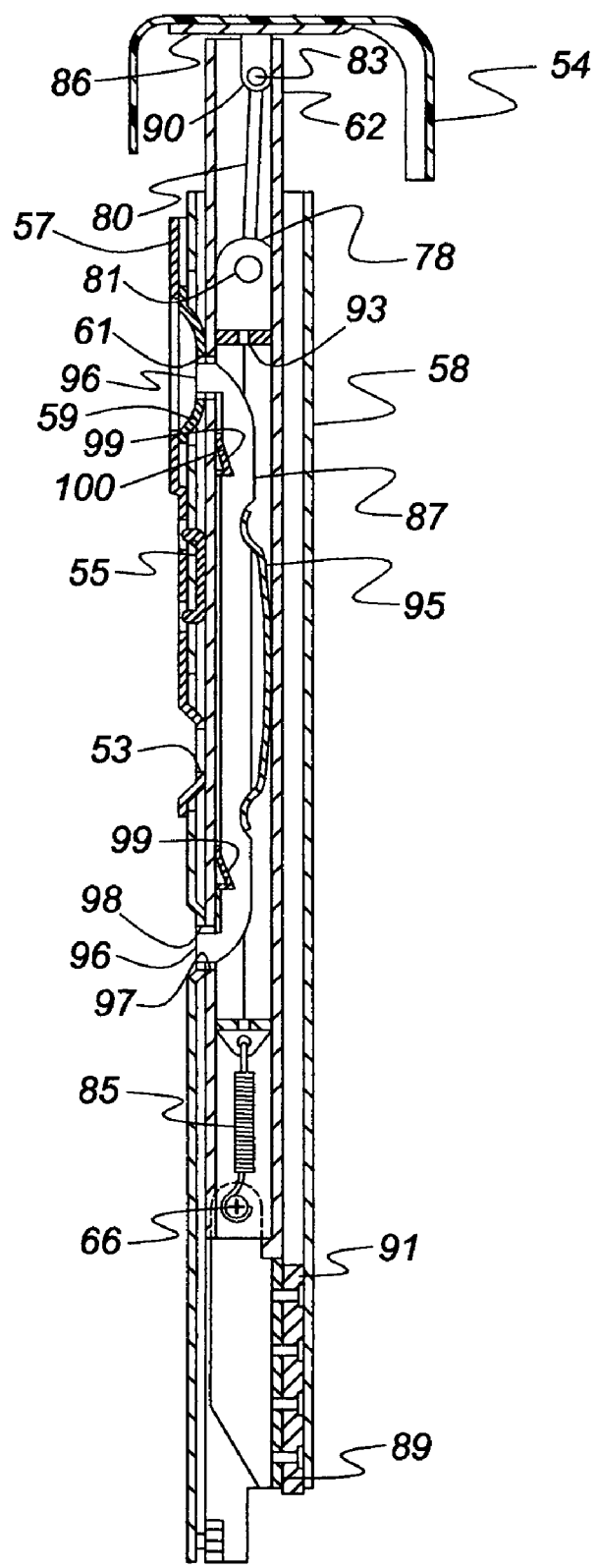
FIG. 13 is a side sectional view of the supplemental tailgate in accordance with the present invention.

The tailgate 20 includes a pair of conventional tailgate hinges 34 (as best seen in FIG. 5) that cooperate with the side panels 28, 30, and a pair of tailgate supports 36, which support the tailgate 20 when in its horizontal position. A tailgate handle 35 mounts to an outer panel 38, and functions in a conventional manner. The tailgate release mechanism and handle 35, as well as tailgate latches, are conventional and well known in the art and so are not shown herein for clarity in describing the present invention. The tailgate 20 is comprised of a tailgate frame 37 including the outer panel 38, which forms the outer finished surface of the tailgate 20, and a tailgate frame inner panel 40, which mounts to the outer panel 38 and forms the inner surface and sides 42 of the tailgate 20. The outer panel 38 and inner panel 40 combine to form a pair of upper surfaces 41 with a gap 43 therebetween. A tailgate reinforcement strainer 44, tailgate reinforcement panel 46, and tailgate reinforcement channel 48 mount and provide structural support to the frame outer and inner panels 38, 40. A left tailgate molding 50 and a right tailgate molding 52 mount on top of the upper surfaces 41. They may be made of colored plastic that is the desired color of the parts; this eliminates the need to paint them. In this way, the tailgate moldings 50, 52 will help to prevent paint scratches on metal parts when cargo is being loaded over the top of a closed tailgate 20.

The components that make up the tailgate frame 37 are formed so that a hollow internal cavity is created. Within this cavity, the supplemental tailgate 22 is retained. The supplemental tailgate 22 includes a pivotable molding 54, a movable frame portion 56 (best seen in FIG. 8), and guide rails 58. The guide rails 58 are hollow, generally rectangular tubes that are fixed to the tailgate frame 37 and support the movable frame portion 56 as it is telescopically extended from and retracted into the guide rails 58.

Each guide rail 58 includes pivot brackets 64 mounted on top that cooperate with the movable frame portion 56 to allow for both pivoting of the movable frame portion 56 relative to the tailgate 20 and preventing the movable frame portion 56 from being separated from the guide rails 58. The pivot brackets 64 may be fastened to the reinforcement channel 48 and the bottoms of the guide rails 58 to the inner panel 40 in order to help secure the guide rails 58 to the tailgate 20.

The movable frame portion 56 includes a pair of support tubes 62 that are each received telescopically in a respective one of the guide rails 58. Each of the guide rails 58 may include a block spacer 55 mounted therein against which the support tubes 62 can slide. The block spacers 55 may be formed of plastic to minimize potential scratching of the support tubes 62 as they slide relative to the guide rails 58. Each of the support tubes 62 includes a hinge pin 66 that cooperates with slots 65 in the pivot brackets 64, when fully extended, in order to allow for pivoting of the movable frame portion 56 relative to the guide rails 58 while still allowing the guide rails 58 to retain and support the support tubes 62. The hinge pins 66 may be secured to the support tubes by welding, interference fit, or some other suitable means. Each of the support tubes 62 also connects to a corresponding one of the latching assemblies 60. The latching assemblies 60 releasably fix the support tubes 62 to a certain limited number of telescopically extended positions relative to the guide rails 58. When extended out partially, the guide rails 58 will hold the support tubes 62 parallel to it, thus creating a longer effective bed for the truck when the tailgate 20 is in its horizontal position.

Each of the movable frame portion's support tubes 62 is hollow so they can receive a respective one of the two latching assemblies 60 therein. More specifically, latch housings 78 extend through each of the support tubes 62 and connect, at their upper ends, to the lower ends of latch actuation rods 80 via retainer barrels 81. The upper ends of the latch actuation rods 80 are secured, via retaining clips 83, to release levers 82, which are part of the pivotable molding 54, in order to form a release hinge 84.

Even though, for some features of the supplemental tailgate 22, only the feature on the left or right side is shown, the supplemental tailgate 22 is generally symmetrical right to left, so the opposite side is just the mirror image of the feature shown on that first side. Accordingly, for the description herein, if the feature is shown on only a first side, the feature on the second, opposite side is presumed to be the mirror image of the feature shown on the first side.

The lower ends of the latch housings 78 connect to latch return springs 85, which, in turn, are connected to the hinge pins 66. Also connected to the hinge pins 66 are linear guides 89. The linear guides 89 may include sliders 91, which provide for surface contact with the inside of the guide rails 58. Alternatively, the linear guides and sliders may be replaced with roller guides and rollers (not shown) in order to provide a more smooth feeling motion when extending and retracting the support tubes 62 relative to the guide rails.

Each of the latch housings 78 also includes a longitudinally extending slot 93, within which is mounted a respective one of two latch blades 87. Each latch blade 87 is biased into its corresponding slot 93 by a latch blade spring 95. The springs 95 cause retention tabs 96, protruding from the latch blades 87, to extend through corresponding holes 97 in the support tubes 62. Also, when aligned, the retention tabs 96 are biased by the springs 95 to extend through engagement slots 98 in the guide rails 58 and through engagement slots 61 in insert plates 59. The insert plates may be secured to their respective guide rails 58 by detent covers 57. The engagement slots 61, 98 may be longer than the width of the corresponding retention tabs 96 and the insert plates 59 adjustable relative to their corresponding detent covers 57 in order to allow for small adjustments in the position of the support tubes 62 relative to the guide rails 58. This small adjustability may allow one to make sure that the top of the pivotable molding 54 is flush with the tops of the tailgate moldings 50, 52 when the supplemental tailgate 22 is in its stowed position. Each latch housing 78 also includes internal flanges 99, located within the slot 93, which engages with release ramps 100 on the latch blade 87.

The movable frame portion 56 also includes a cross member assembly 68 that connects to the tops of the support tubes 62. The cross member assembly 68 includes a pair of cross members 69a and 69b, post brackets 71 and lock rod brackets 67 that form a support frame 70. The cross member assembly 68 also includes a pair of hollow tubes 72 and six pivot mounts 73 mounted on the support frame 70.

The support frame 70 may be formed strong enough to support the weight of one or more people standing on it. This way, when the movable frame portion 56 is extended out and pivoted downward toward the ground, the support frame 70 may be used as a step.

The hollow tubes 72 each telescopically receive a respective one of two lock rod assemblies 74, which each have pivot hinges 75 at one end of a rod 126 and lock rod latches 76 at the far ends. The pivot hinges 75 allow the lock rod assemblies 74 to be extended toward the truck so that the lock rod latches 76 can hook to supports 79 on the truck box 26 in order to allow the movable frame portion 56 to be held in its upright position, thus creating a box extender.

The pivot mounts 73 connect to and mount the pivotable molding 54 about a pivot axis 77. More specifically, the pivotable molding 54 may be formed from plastic, or other suitable material, such as, for example, a thirty percent glass filled polypropylene. The release levers 82 may be molded into the pivotable molding 54 while it is being formed or affixed thereto after forming by, for example, friction welding. Each release lever 82 includes a base 86 that is adjacent to the pivotable molding 54, a pivot flange 88 extending from one end of the base 86, and a release flange 90 extending from the other end. Each pivot flange 88 pivotally mounts about one of the pivot mounts 73 and is secured with a hinge rod 92. The pivot flange 88, then, will allow the pivotable molding 54 to pivot about the pivot axis 77. Each release flange 90 is offset from the pivot axis 77 and is connected to one of the latch actuation rods 80. Thus, when the pivotable molding 54 is pivoted, the release flanges 90 will pull up on the latch actuation rods 80. The latching assemblies 60 unlatch, allowing the support tubes 62 to slide relative to the guide rails 58, when the latch actuation rods 80 are pulled upwards, and re-engage when the latch actuation rods 80 are released.

The pivotable molding 54 may be molded with the plastic being the desired final color so that it does not have to be painted. The pivotable molding 54 may also include a handle pocket 94 that is molded into the rear surface of the pivotable molding 54. The handle pocket 94 provides for ease of gripping and pivoting the pivotable molding 54 when deploying the supplemental tailgate 22. The pivotable molding 54 also may have an overall width that is just smaller than the gap 43 formed between the two tailgate moldings 50, 52, and has a top surface that is flush with the top surfaces of the two tailgate moldings 50, 52. Additionally, if so desired, the two tailgate moldings 50, 52 may include recessed flanges (not shown) that nest under the edges of the pivotable molding 54. Accordingly, the supplemental tailgate 22, when in its fully retracted position, will blend-in with the tailgate 20, having an appearance that is very similar to a tailgate that does not include a supplemental tailgate. Thus, the supplemental tailgate 22 can be included without detracting from the esthetically pleasing look of the vehicle, and, moreover, the pivotable molding 54 will still allow for cargo to be slid into and out of the box 26 over the top of a closed tailgate 20 without creating paint scratch concerns.

The operation of the supplemental tailgate 22 will now be described. The supplemental tailgate 22 may be easily released from its stowed position within the tailgate 20 while the tailgate 20 is in its open or closed position. For the most advantageous use of the supplemental tailgate functions, the tailgate 20 will be in its horizontal open position. One may, if so desired, employ an extra latching mechanism (not shown) that may only allow release of the supplemental tailgate 22 when the tailgate is in its horizontal position.

To deploy the supplemental tailgate 20 from its stowed position, one grasps the pivotable molding 54 and pivots it relative to the pivot axis 77. This will cause the release flanges 90 to pull up on the latch actuation rods 80, which, in turn, will pull up on the latch housings 78 against the bias of the latch return springs 85. As the latch housings 78 move upward, the internal flanges 99 slide along the release ramps 100, which causes the latch blades 87 to begin sliding against the bias of the latch blade springs 95. As the latch blades 87 slide outward, the retention tabs 96 slide out of the engagement slots 61, 98, thus releasing the movable frame portion 56 and allowing it to slide relative to the guide rails 58. Springs (not shown) may be provided to bias the movable frame portion 56 away from the tailgate frame 37 when the latching assemblies 60 are released, but are not necessary for operation of this invention.

One then pulls on the supplemental tailgate 22 to telescopically slide the support tubes 62 relative to the guide rails 58, while allowing the pivotable molding 54 to pivot back into its latch engaged position. Once the movable frame portion 56 is slid out to a predetermined extended position relative to the tailgate 20, the retention tabs 96 on the lower end of the latch blades 87 will engage an engagement slot 53 or engagement slot 61 (depending upon how far the support tubes 62 are slid prior to releasing the pivotable molding 54), thus fixing the movable frame portion 56 relative to the guide rails 58. Also, at one of these extended positions, the support tubes 62 still remain partially within the guide rails 58 so that the two will not pivot relative to one another. With the tailgate 20 in its horizontal open position, the supplemental tailgate 22 is now in its bed extender position. While only a limited number of bed extender positions are discussed herein, the supplemental tailgate 22 may have additional bed extender positions by providing additional engagement slots, if so desired.

The pivotable molding 54 may then be pivoted again to release the latching assemblies 60 once more. One may then pull the supplemental tailgate 22 out to its fully extended position relative to the open tailgate 20. In this fully extended position, the support tubes 62 will be pulled out of the guide rails 58, with the hinge pins 66 engaged in the slots 65 of the pivot brackets 64.

The movable frame portion 56, from its fully extended position, may be pivoted into a downward extending vertical position to serve as a step, with the support frame 70 acting as the step. In this downward position, the pivotable molding 54 is on the underside of the movable frame portion 56, so it will not be stepped-on and damaged by the operator. Also, the support tubes 62 may be short enough that the pivotable molding 54 is spaced above the ground upon which the vehicle is standing. In this way, the molding 54 will not be scraped or damaged by contact with the ground, and the support frame 70, being higher off of the ground, will provide a better assist step function.

The movable frame portion 56, from its fully extended position, can also be pivoted upward into an upward extending vertical position, to serve as a box extender. The lock rod assemblies 74 are deployed and latched onto the hook supports 79 on the box 26 in order to hold the movable frame portion 56 in the upright position. The hook supports 79 may be just the existing pin strikers that are normally used to hold the tailgate 20 in its closed position. In this way, the vehicle 24 is essentially the same, with the only difference being whether a conventional tailgate or the tailgate 20 of the present invention is mounted on the vehicle 24.

Performing the deployment operation generally in reverse will allow one to easily stow and latch the supplemental tailgate 22 back into the tailgate 20. Hence, an easy to operate and ergonomic supplemental tailgate 22 is provided for the vehicle 24.

Figure 14:
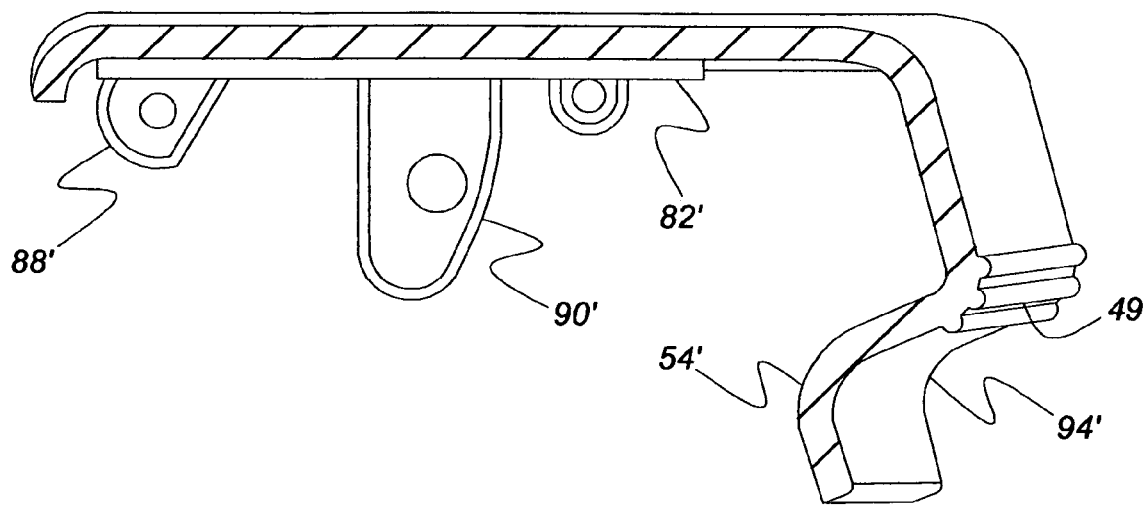
FIG. 14 is a side, partial sectional view of the pivotable molding and release lever according to a second embodiment of the present invention.
Figure 15:
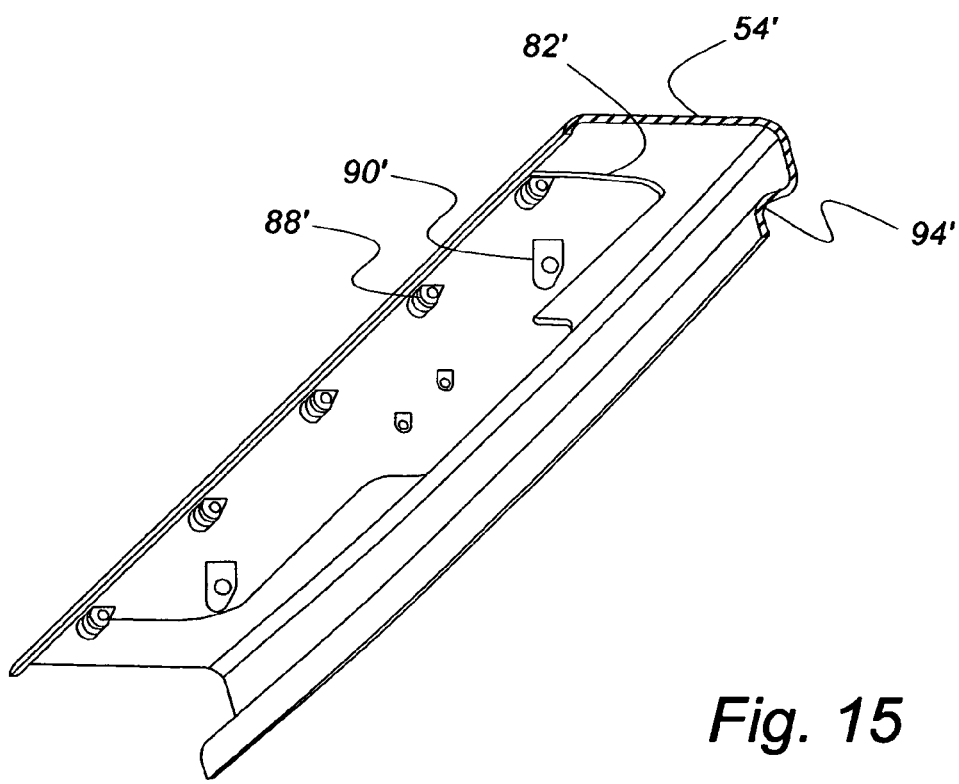
FIG. 15 is a front perspective view of the pivotable molding and release lever of FIG. 14.

FIGS. 14 and 15 illustrate a second embodiment of the present invention. This embodiment is very similar to the first, but with the pivotable molding 54' and the release lever 82' modified somewhat. The pivotable molding 54' is now shaped with an inwardly curved portion 94' along most of its length that serves as the handle pocket. The extra length may be more convenient for one grabbing the pivotable molding 54' to pivot it. Handle beads 49 also may be provided along some or all of the outer surface of the pivotable molding 54' in order to aid in gripping and pivoting the pivotable molding 54'. Also, the spaced release levers of the first embodiment are now replaced with a single larger release lever 82'. The release lever 82' still includes the pivot flange 88', which connects to the pivot mounts 73 (not shown in FIGS. 14 and 15), and the release flanges 90', which connect to the latch actuation rods 80 (also not shown in FIGS. 14 and 15). For this release lever 82' and pivotable molding 54' combination, each may be formed separately and then vibration welded together. Although, other techniques of securing them together may be employed, if so desired.

Figure 16:
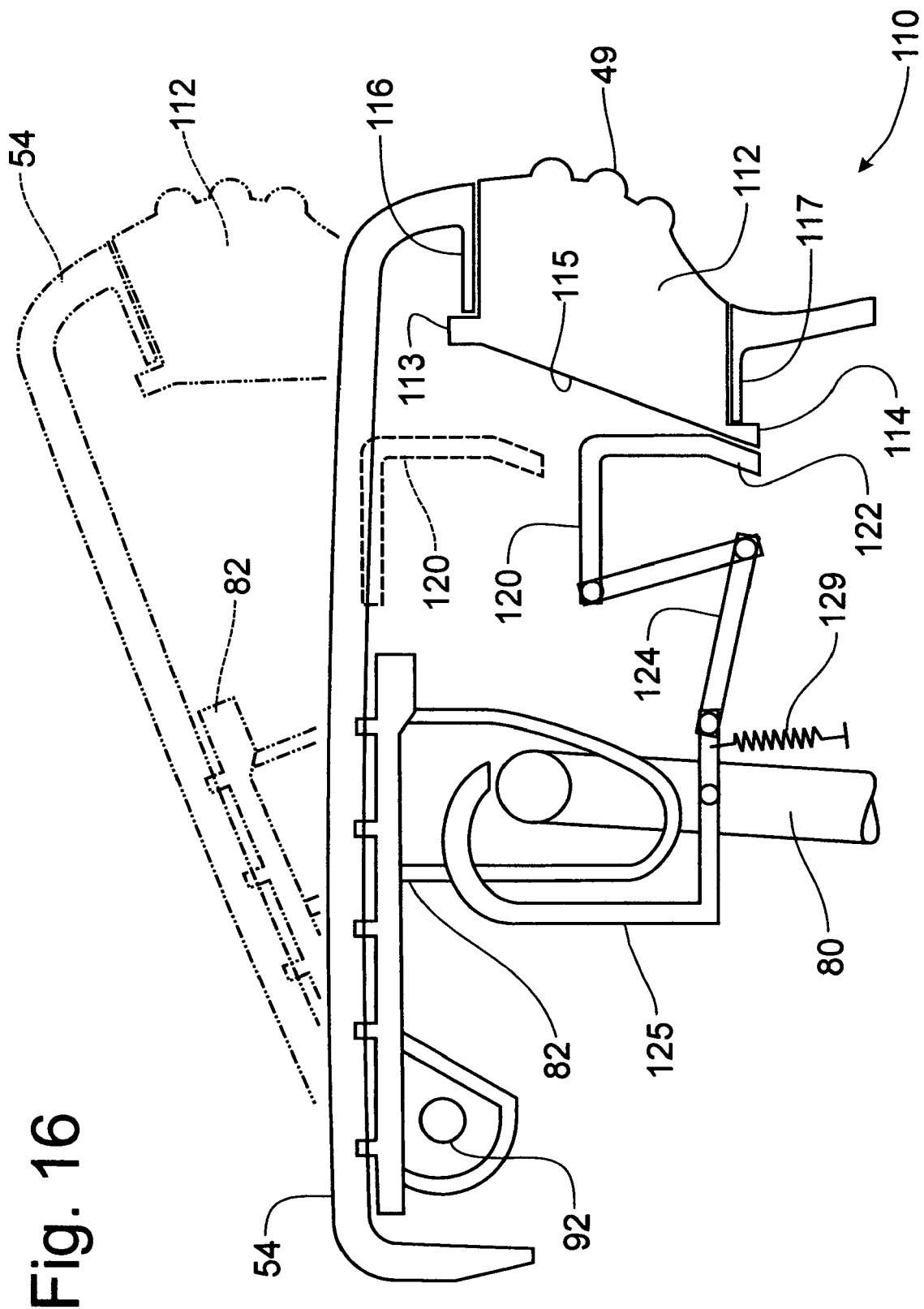
FIG. 16 is a cross-sectional view through the pivotable molding to show a push button release mechanism operable to lock the pivotable molding in a closed position, the push button release mechanism being depicted in the locked position, the pivoted movement of the molding being shown in phantom, the elevated position of the wedge member being shown in dotted lines.
Figure 17:
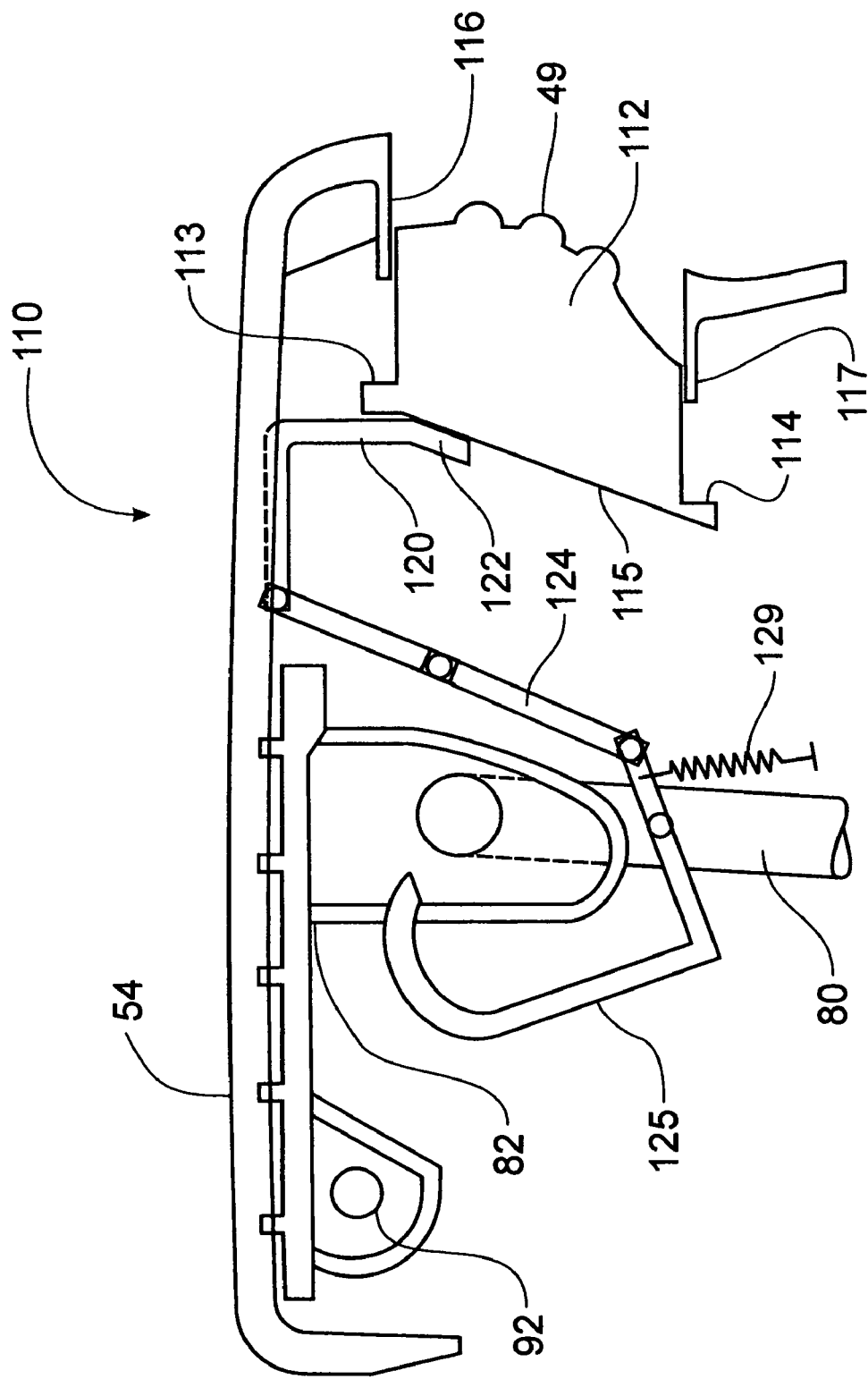
FIG. 17 is a cross-sectional view of the pivotable molding similar to that of FIG. 16 but with the push button actuated to effect a release of the locking mechanism restraining movement of the pivotable molding.

Referring now to FIGS. 16–17, a push button release mechanism 110 for the supplemental tailgate apparatus 22 can best be seen. The push button release mechanism 110 is cooperable with the pivotable molding 54 to prevent an inadvertent movement of the molding 54 from releasing the supplemental tailgate apparatus 22 from its stowed position within the tailgate 20. The first embodiment of the push button release mechanism 110 utilizes the shape of the pivotable molding 54 as substantially depicted in FIG. 14 and forms a push button 112 at the handle beads 49. The push button 112 is preferably formed as a cored out plastic block and is slidably positioned in the molding 54 between an upper channel flange 116 and a lower channel flange 117 that guide the push button 112 in a linear path of movement.

The push button 112 is preferably formed with an upper stop member 113 and a lower stop member 114. The lower stop member 114 hangs below the level of the lower channel flange 117 and engages the lower channel flange 117 when the push button 112 is in a locked position, as is depicted in FIG. 16, to prevent the push button 112 from popping rearwardly out of the molding 54. The upper stop member 113 extends upwardly above the upper channel flange 116 and cooperates therewith to assist the lower stop member 113 from allowing the push button 112 from popping out of the molding 54. The upper stop member 113 also is operable to engage the wedge 120 when the push button 112 is moved into an actuating position, as is depicted in FIG. 17 to limit the movement of the push button 112 inwardly with respect to the molding 54.

The push button 112 has a sloped cam surface 115 that is engagable with a sloped flange 122 on the wedge 120. The inward movement of the push button 112 from the position shown in FIG. 16 to the position shown in FIG. 17 causes the wedge member 120 to move vertically with respect to the push button 112. The vertical movement of the wedge member 120 pulls on a linkage 124 to pivot a catch member 125 that is pivotally supported for selective engagement with a part of the pivotable molding 54, which as depicted in FIGS. 16 and 17 can be the release lever 82. A spring 129 urges the catch member into engagement with the pivotable molding 54. When the wedge member 120 is moved to its highest position, the linkage 124 causes the catch member 125 to pivot against the biasing force exerted by the spring 129 and release the pivotable molding 54 for movement to deploy the supplemental tailgate apparatus 22.

Once the molding 54 has been pivoted upwardly, as is shown in phantom in FIG. 16, the catch member 125 is permitted to return to the locking position as the wedge member 120 can fall back into its rest position. The return of the molding to the home position, engages the sloped outer surface of the catch member 125 and deflects the catch member 125 against the biasing force exerted by the spring 129 until the release lever 82 passes the catch member 125, whereupon the catch member 125 returns to the locking position to secure the pivotable molding 54 against further movement.

Figure 18:
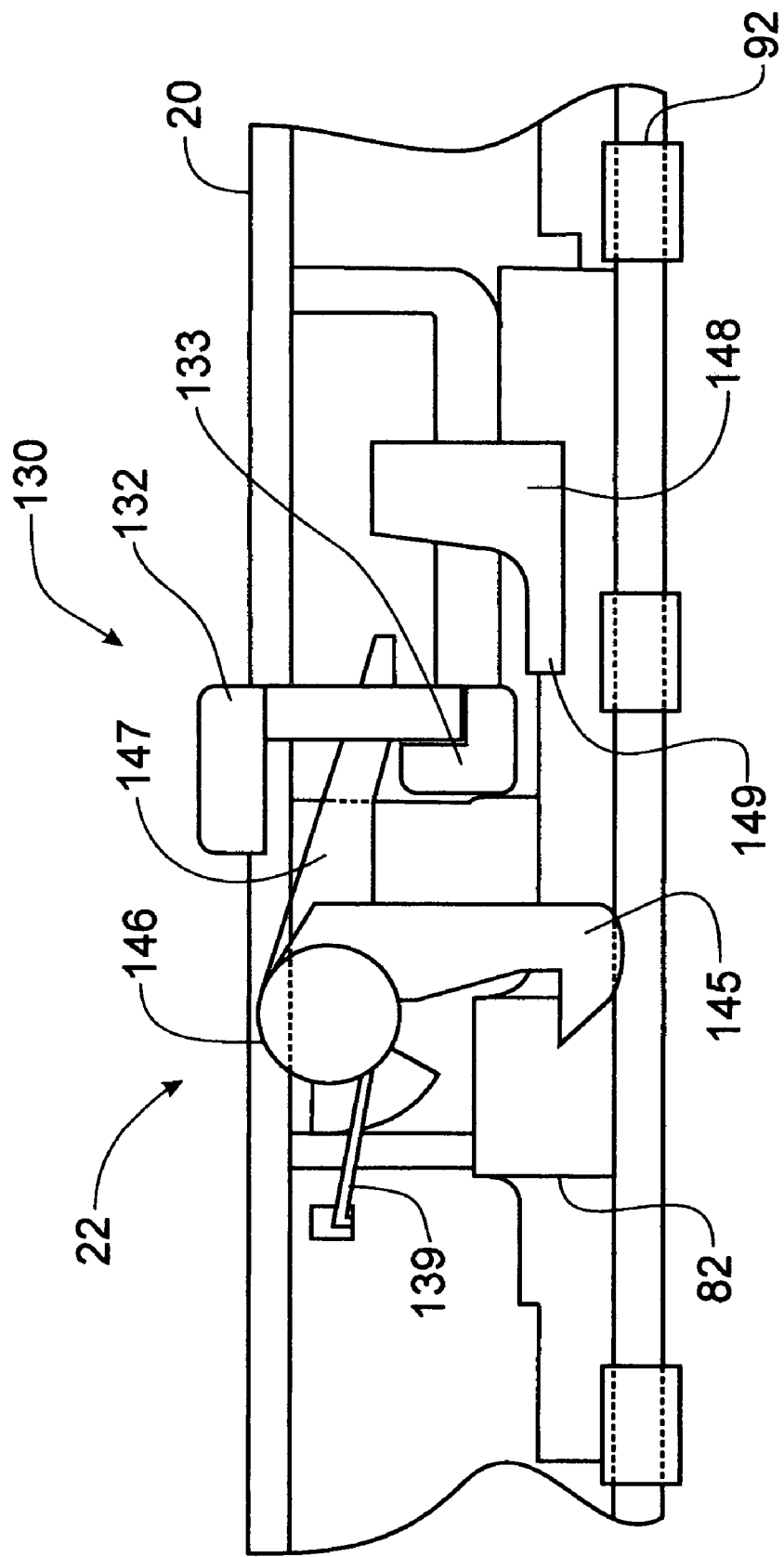
FIG. 18 is a top plan view of the supplemental tailgate with the pivotable molding removed for purposes of clarity to depict a second embodiment of the push button release mechanism for locking the pivotable molding in a closed position, the push button release mechanism being depicted in a locked position.
Figure 19:
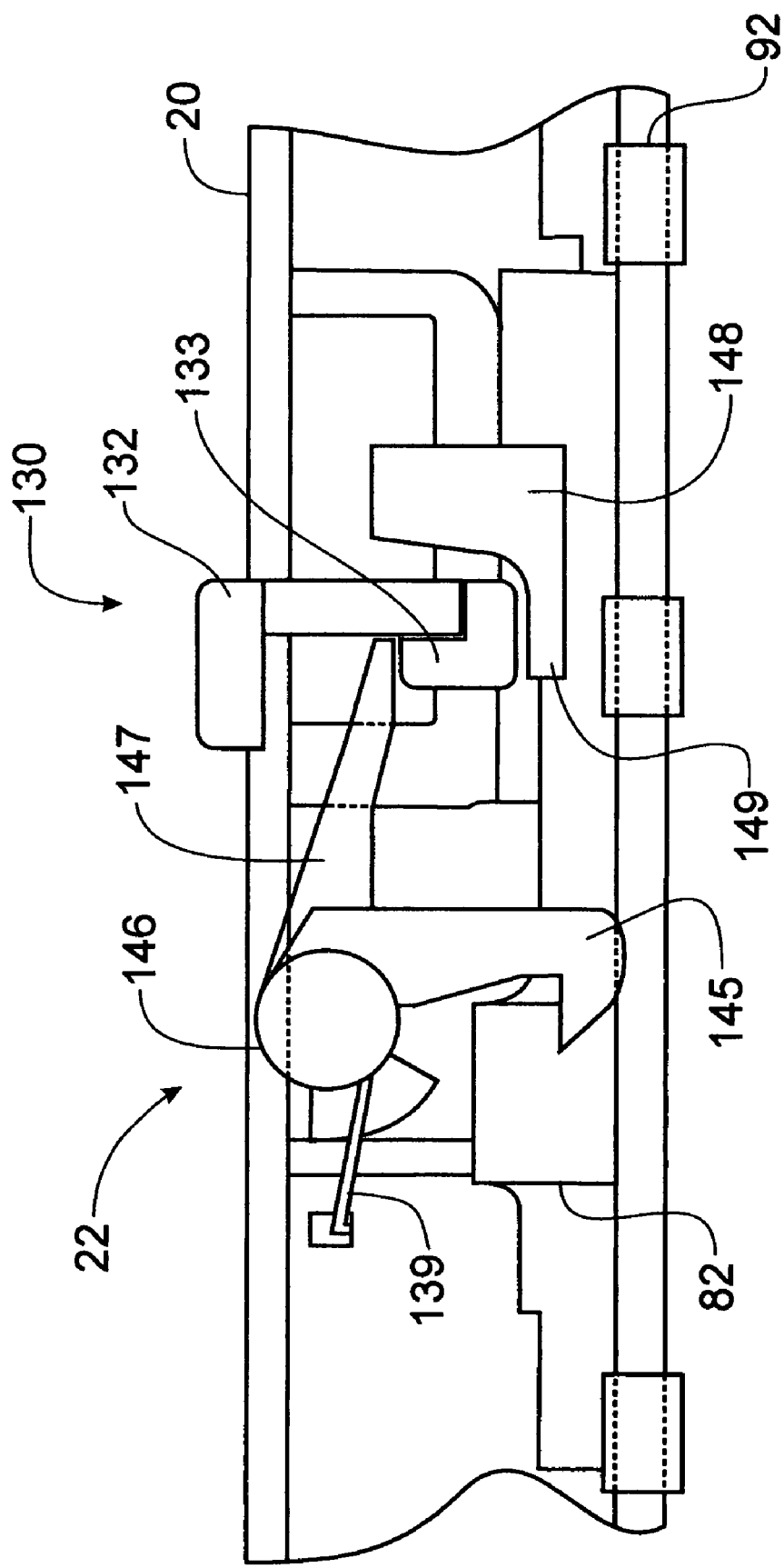
FIG. 19 is a top plan view of the supplemental tailgate similar to that of FIG. 18 but with the push button being moved into a actuation position.
Figure 20:
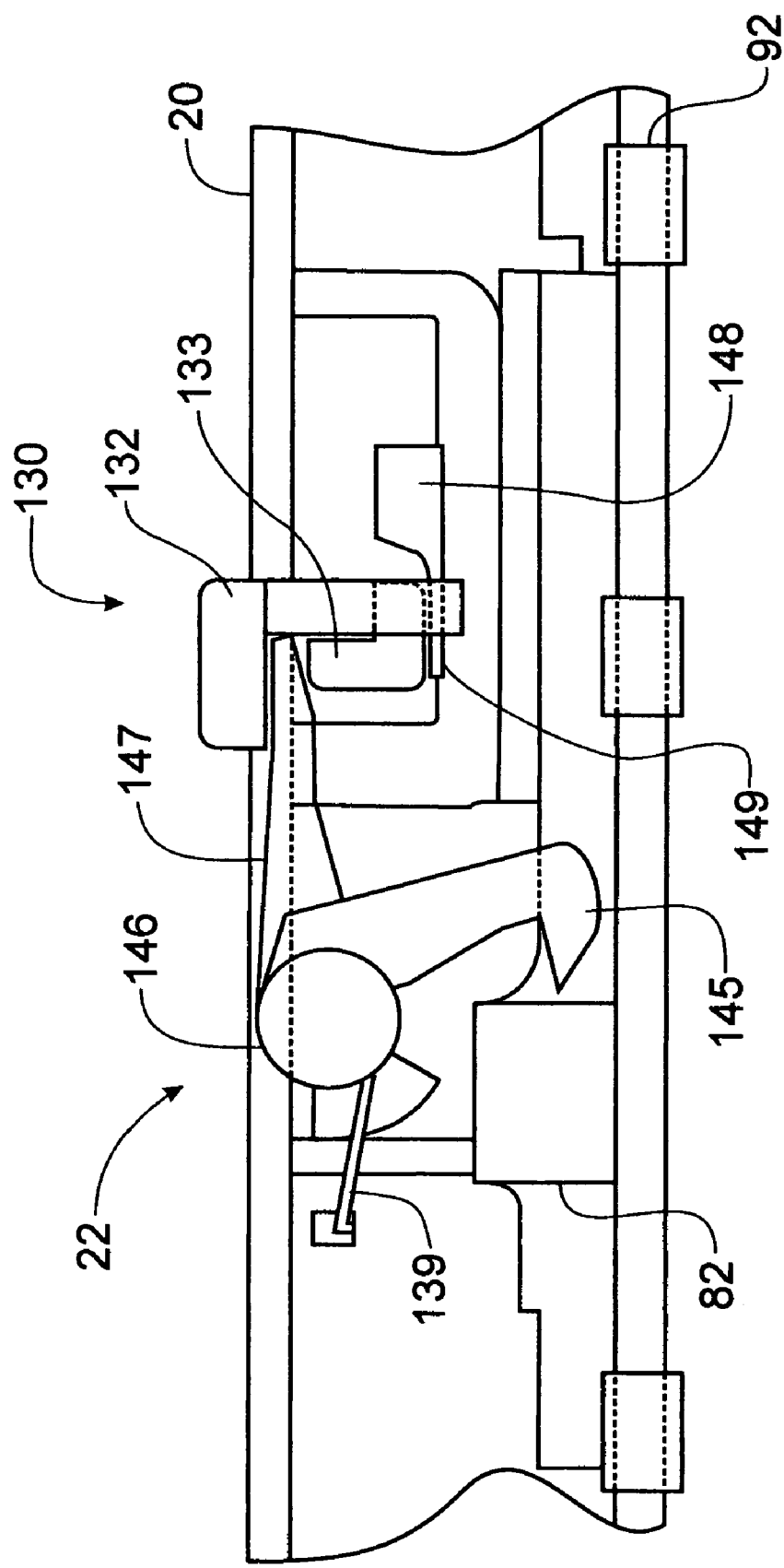
FIG. 20 is a top plan view of the supplemental tailgate similar to that of FIG. 19 but with the catch mechanism pivoted to allow a release of the supplemental tailgate for deployment thereof.

A different configuration of the push button release mechanism 130 can be found in FIGS. 18–20. Whereas the configuration of the release mechanism 110 depicted in FIGS. 16–17 utilized a push button 112 that depressed into the molding structure 54, the configuration of the release mechanism 130 shown in FIGS. 18–20 utilizes a push button 132 that slides along the molding 54. The supplemental tailgate structure 22 is retained in the stowed position by a catch member 145 that is rotatable through a limited deflection about the pivot 146. A torsion spring 139 mounted on the pivot 146 urges the catch member 132 into a locked position in engagement with a portion of the supplemental tailgate 22, preferably the release lever 82. The catch member 145 also includes an actuation lever 147 that projects laterally of the pivot 146.

A center molding member 148 is formed as part of the pivotable molding 54, preferably molded into the molding structure 54, so as to be pivotally movable therewith. The center molding member 148 includes a laterally extending finger 149 that is positioned fore-and-aft of the actuation lever 147, but spaced therefrom. The push button 132 is slidably mounted on the molding 54 and is engaged with a spacer 133 in a manner to be able to move the spacer 133 laterally with the slidable push button 132, but allow the spacer 133 to move longitudinally with respect to the push button 132 for purposes to be described in greater detail below. The push button 132 and engaged spacer 133 are slidably movable from a locked position, best seen in FIG. 18, to an actuation position, best seen in FIG. 19.

When the push button 132 and spacer 133 are moved into the actuation position, the spacer 133 fills the gap between the actuation lever 147 and the center molding finger 149 so that any movement of the finger 149 is transferred directly to the actuation lever 147 to cause pivotal movement of the catch member 145, as is best shown in FIG. 20. The positioning of the push button 132 and engaged spacer 133 in the lock position, as depicted in FIG. 18, positions the spacer 133 out of engagement with the center molding member 148 such that the movement thereof is ineffective to pivot the catch member 145. Furthermore, a positioning of the slidable push button 132 closer to the pivot 146 than the position shown in FIG. 18 would place the push button 132 and the spacer 133 into an interfering position with respect to any pivotal movement of the catch member 145, thus locking the supplemental tailgate 22 in the stowed position. Preferably, the push button 132 is cooperative with a position control device (not shown) that will prevent inadvertent sliding movement of the push button 132.

In operation, when the supplemental tailgate 22 is to be deployed, the push button 132 is moved laterally with the spacer 133 into the actuation position depicted in FIG. 19 so that the spacer 133 bridges the gap between the actuation lever 147 and the center molding finger 149. The pivotal movement of the molding 54 will cause the center molding finger 149 to press against the spacer 133, which in turn pushes against the actuation lever 147 to cause the actuation lever 147 to move into the position shown in FIG. 20, pivoting the catch member 145 to disengage from the supplemental tailgate 22. The supplemental tailgate 22 can then be extended from the tailgate structure 20, as described above.

Figure 21:
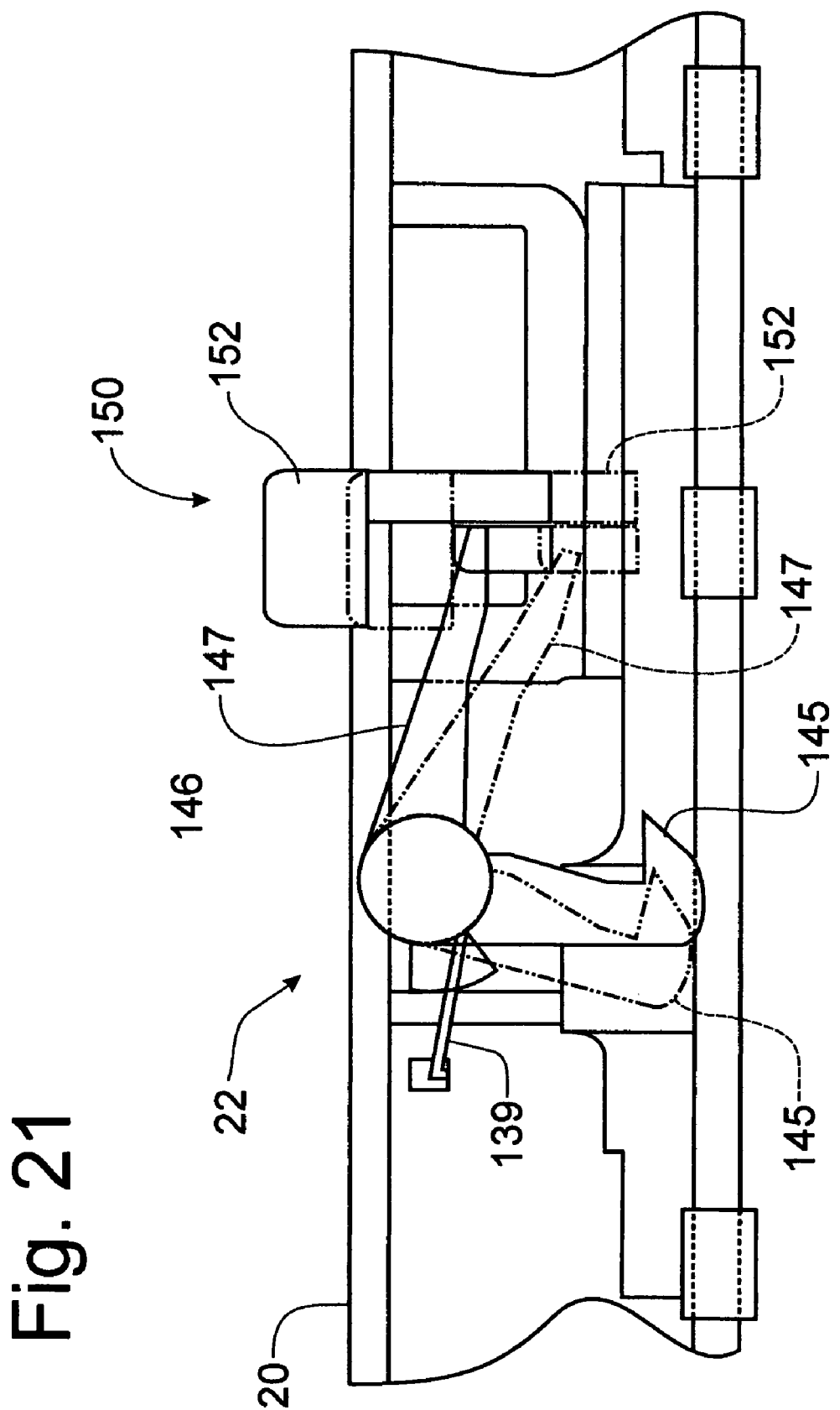
FIG. 21 is a top plan view of a third embodiment of a push button release mechanism that is directly coupled to the catch member to effect release thereof for deployment of the supplemental tailgate apparatus, the movement of the catch member and actuation lever to disengage the supplemental tailgate apparatus being shown in phantom.

FIG. 21 is a third embodiment of a push button release mechanism 150 in which the push button 152 depresses into the molding structure 54, but is connected directly to the actuation lever 147 to effect pivotal movement of the catch member 145 for deployment of the supplemental tailgate structure 22. In this embodiment, the molding 54 would not pivot, but would be fixed to the supplemental tailgate structure 22 for deployment therewith. In operation, the push button 152 would be depressed into the tailgate structure 20 to cause a pivotal movement of the catch member 145 and enable the supplemental tailgate apparatus 22 to be pulled out of the tailgate structure 20. The torsion spring 139 will return the push button 152 out of the tailgate 20 via the direct connection of the actuation lever 147 to the push button 152. One skilled in the art will recognize that the catch mechanism 145 would be adapted to re-engage automatically the supplemental tailgate apparatus 22 when returned to the stowed position within the tailgate 20.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A tailgate assembly for use with a motor vehicle having a pair of spaced, generally vertical side walls and a generally horizontal bed extending therebetween, the tailgate assembly comprising:
   a tailgate frame including a rear panel and a front panel adapted to pivotally mount generally between the side walls for movement between a generally vertical closed position and a generally horizontal open position, said tailgate frame having a peripheral edge defining a top portion of said tailgate frame when in said closed position; and
   a supplemental tailgate assembly mounted within and being selectively movable relative to said tailgate frame between a retracted position and an extended position, said supplemental tailgate assembly including a latch mechanism operable to restrain movement of said supplemental tailgate assembly relative to said tailgate frame;
   a molding member supported on said frame assembly at said peripheral edge of said tailgate frame and being pivotable relative to said supplemental tailgate assembly to actuate said latch mechanism in response to the pivotal movement of said molding member; and
   a push button control member operably associated with said molding member to control the operation thereof for actuating said latch mechanism.

2. The tailgate assembly of claim 1 wherein said push button control member is depressible into said molding member to release a catch member restraining said molding member from pivotal movement.

3. The tailgate assembly of claim 2 wherein said push button control member is formed with a cam surface engagable with a wedge member to cause generally orthogonal movement of said wedge member in response to a depressing of said push button control member into said molding member, the movement of said wedge member causing a pivoting of said catch member to release said molding member for pivotal movement.

4. The tailgate assembly of claim 3 wherein said push button control member is formed with upper and lower stop members to limit the length of movement of said push button control member relative to said molding member, said upper stop member being engagable with said wedge member to limit the depression of said push button control member into said molding member.

5. The tailgate assembly of claim 1 wherein the push button control member is slidable laterally along said molding member to control the operation of said molding member to operate said latch mechanism.

6. The tailgate assembly of claim 5 wherein said molding member includes a central molding actuator that is movable with the pivotal movement of said molding member, said latch mechanism including a pivoted catch member with an actuation lever that is spaced from said central molding actuator to form a gap therebetween, said push button control member including a spacer positionable to fill said gap between said central molding actuator and said actuation lever to permit the movement of said central molding actuator to transfer movement to said actuation lever to pivot said catch member.

7. The tailgate assembly of claim 6 wherein said spacer is supported on said push button control member for linear movement relative thereto when said central molding actuator moves said spacer into engagement with said actuation lever.

8. The tailgate assembly of claim 7 wherein said spacer is laterally movable with said push button control member to be positioned out of engagement with said central molding actuator, thereby preventing the pivotal movement of said molding member to operate said latch mechanism.

9. In a pick-up truck having a pair of spaced, generally vertical side walls and a generally horizontal bed extending therebetween; a tailgate pivotally mounted between said side walls for movement between a generally vertical closed position and a generally horizontal open position, said tailgate having a peripheral edge defining a top portion of said tailgate frame when in said closed position; and a supplemental frame assembly supported within said tailgate to be selectively movable relative to said tailgate between a retracted position and an extended position, said supplemental frame assembly including a latch mechanism operable to restrain movement of said supplemental frame assembly relative to said tailgate, the improvement comprising:
   a push button control member operably associated with said latch mechanism to control the operation thereof for releasing said supplemental frame assembly for movement from said retracted position to said extended position.

10. The pick-up truck of claim 9 further comprising a molding member supported on said frame assembly at said peripheral edge of said tailgate and being pivotable relative to said supplemental frame assembly to actuate said latch mechanism in response to the pivotal movement of said molding member.

11. The pick-up truck of claim 10 wherein the push button control member is slidable laterally along said molding member to control the operation of said molding member to operate said latch mechanism.

12. The pick-up truck of claim 11 wherein said molding member includes a central molding actuator that is movable with the pivotal movement of said molding member, said latch mechanism including a pivoted catch member with an actuation lever that is spaced from said central molding actuator to form a gap therebetween, said push button control member including a spacer positionable to fill said gap between said central molding actuator and said actuation lever to permit the movement of said central molding actuator to transfer movement to said actuation lever to pivot said catch member.

13. The pick-up truck of claim 12 wherein said spacer is supported on said push button control member for linear movement relative thereto when said central molding actuator moves said spacer into engagement with said actuation lever.

14. The pick-up truck of claim 13 wherein said spacer is laterally movable with said push button control member to be positioned out of engagement with said central molding actuator, thereby preventing the pivotal movement of said molding member to operate said latch mechanism.

15. The pick-up truck of claim 10 wherein said push button control member is depressible into said molding member to release a catch member restraining said molding member from pivotal movement.

16. The pick-up truck of claim 15 wherein said push button control member is formed with a cam surface engagable with a wedge member to cause generally orthogonal movement of said wedge member in response to a depressing of said push button control member into said molding member, the movement of said wedge member causing a pivoting of said catch member to release said molding member for pivotal movement.

17. A supplemental tailgate assembly for use with a vehicle tailgate pivotally supported between a pair of transversely spaced side walls for movement between a generally vertical closed position and a generally horizontal open position, comprising:
- a frame assembly extendable from said tailgate and including a transversely extending cross member having a pair of transversely spaced pivot mounts thereon, said frame assembly being restrained within said tailgate by a latch mechanism which when disengaged permits said frame assembly to move from a retracted position into an extended position relative to said tailgate; and
- a push button control member operably associated with said latch mechanism to control the operation thereof for releasing said frame assembly for movement from said retracted position to said extended position.

18. The supplemental tailgate assembly of claim 17 further comprising a molding member supported on said frame assembly for pivotable movement relative to said frame assembly to actuate said latch mechanism in response to the pivotal movement of said molding member, said push button control member being depressible into said molding member to release a catch member restraining said molding member from pivotal movement.

19. The supplemental tailgate assembly of claim 17 further comprising a molding member supported on said frame assembly for pivotable movement relative to said frame assembly to actuate said latch mechanism in response to the pivotal movement of said molding member, said push button control member being slidable laterally along said molding member to control the operation of said molding member to operate said latch mechanism.

20. The supplemental tailgate assembly of claim 19 wherein said molding member includes a central molding actuator that is movable with the pivotal movement of said molding member, said latch mechanism including a pivoted catch member with an actuation lever that is spaced from said central molding actuator to form a gap therebetween, said push button control member including a spacer positionable to fill said gap between said central molding actuator and said actuation lever to permit the movement of said central molding actuator to transfer movement to said actuation lever to pivot said catch member, said spacer being supported on said push button control member for linear movement relative thereto when said central molding actuator moves said spacer into engagement with said actuation lever and being laterally movable with said push button control member to be positioned out of engagement with said central molding actuator, thereby preventing the pivotal movement of said molding member to operate said latch mechanism.

* * * * *

UNITED STATES PATENT AND TRADEMARK OFFICE
CERTIFICATE OF CORRECTION

PATENT NO.         : 7,213,859 B1
APPLICATION NO. : 11/495469
DATED              : May 8, 2007
INVENTOR(S)        : Kian-Huat Tan et al.

Page 1 of 1

It is certified that error appears in the above-identified patent and that said Letters Patent is hereby corrected as shown below:

Title page, item [73] should read as follows
Assignees:     Ford Global Technologies, LLC
               Dearborn, MI (US)

Multimatic, Inc.
               Markham, Ontario (CA)

Signed and Sealed this

Twelfth Day of August, 2008

JON W. DUDAS
*Director of the United States Patent and Trademark Office*